(12) United States Patent
Usui

(10) Patent No.: US 7,125,096 B2
(45) Date of Patent: Oct. 24, 2006

(54) DRAWING DEVICE, ELECTRO-OPTICAL UNIT, AND ELECTRONIC APPARATUS

(75) Inventor: Takahiro Usui, Shiojiri (JP)

(73) Assignee: Seiko Epson Corporation(JP)

( * ) Notice: Subject to any disclaimer, the term of this patent is extended or adjusted under 35 U.S.C. 154(b) by 263 days.

(21) Appl. No.: 10/812,405

(22) Filed: Mar. 26, 2004

(65) Prior Publication Data

US 2004/0246282 A1    Dec. 9, 2004

(30) Foreign Application Priority Data

Mar. 31, 2003    (JP)    ............................. 2003-095972

(51) Int. Cl.
  *B41J 2/165*    (2006.01)
  *H01L 21/31*    (2006.01)
(52) U.S. Cl. ........................................ 347/34; 438/782
(58) Field of Classification Search .................. 347/29, 347/34; 118/52; 438/715, 747, 778, 782
See application file for complete search history.

(56) References Cited

U.S. PATENT DOCUMENTS 6,734,029 B1 * 5/2004 Furusawa .................... 438/22
6,883,895 B1 * 4/2005 Murakami et al. ............ 347/29
2004/0001921 A1 * 1/2004 Kolb et al. .................. 427/421

FOREIGN PATENT DOCUMENTS

| JP | 2002-264366 | 9/2002 |
| JP | 2003-112098 | 4/2003 |

* cited by examiner

*Primary Examiner*—Anh T. N. Vo
(74) *Attorney, Agent, or Firm*—Harness, Dickey & Pierce, P.L.C.

(57) ABSTRACT

A drawing device is provided that applies drawing liquid containing a drawing material dissolved or dispersed in a solvent onto a substrate. The drawing device includes a liquid drop emitter having a liquid drop ejection head that ejects the drawing liquid onto the surface of the substrate, a substrate stage having the substrate mounted thereon, moving means for relatively moving the liquid drop ejection head or the substrate stage, and control means for controlling at least one of the liquid drop ejection head and the substrate stage. A wall is disposed on at least one of the liquid drop ejection head and the substrate stage to prevent the solvent from flowing out.

4 Claims, 11 Drawing Sheets

DRAWING DEVICE, ELECTRO-OPTICAL UNIT, AND ELECTRONIC APPARATUS

RELATED APPLICATIONS

This application claims priority to Japanese Patent Application No. 2003-095972 filed Mar. 31, 2003 which is hereby expressly incorporated by reference herein in its entirety.

BACKGROUND

1. Technical Field of the Invention

The present invention relates to a drawing device, and in particular, a drawing device providing stable ink droplet ejection, an electro-optical unit and an electronic apparatus manufactured by using the drawing device.

2. Description of the Related Art

A liquid drop emitter for ejecting droplets of writing liquid, such as ink, to a color filter used for a liquid crystal display device or the like includes, for example, an inkjet head for ejecting ink. Such an inkjet head has an ink nozzle for ejecting ink. Ink ejected from the ink nozzle is applied to the color filter. In particular, the inkjet head has a piezo-electric element, which deforms in accordance with an applied voltage to eject the ink from the ink nozzle. Thus, an inkjet head that can easily control the ejection of the ink is achieved. A method ejecting ink in this manner is referred to as an inkjet method.

With reference to FIG. 12, an inkjet head 12 for the inkjet method has a plurality of ink nozzles 37, for example, 180 nozzles per line, on its bottom surface. Liquid ink is intermittently ejected from the ink nozzles and the ink is disadvantageously deposited on the tops of the ink nozzles or on the inner surfaces of the nozzles due to an inevitable increase in viscosity of the ink after long-term use.

Using the ink nozzles with the deposited ink results in misdirected ink ejected from the ink nozzles or clogged ink nozzles due to the deposited ink, which, in turn, results in faulty ejection of the ink nozzles.

Therefore, with reference to FIG. 13 illustrating a known technology, a substrate 1, to which the ink is ejected, is mounted on a stage 16. The stage 16 has ink trays 9 for receiving the ink from the inkjet head 12 in a standby mode. In particular, the ink trays 9 are disposed in an area where the inkjet head moves away from the ink-application area of the substrate.

The inkjet head 12 moves to the locations of the ink trays 9 and ejects ink thereto unless the inkjet head 12 ejects ink onto the substrate, such as a color filter. This action is known as "flushing". Such flushing of the ink prevents the ink nozzles from becoming clogged with the ink sticking to the inner surface of the nozzles due to ink thickening.

Unfortunately, in the known inkjet method described above, the flushing operation causes the following problems:

the flushing wastes ink;

the flushing is time-consuming and thereby increases the total drawing time; and the flushing requires various means and thereby increases the cost of the drawing device.

Accordingly, an object of the present invention is to provide a drawing device that ejects droplets stably without the flushing required in the known technology, and to provide an electro-optical unit and an electronic apparatus manufactured by using the drawing device.

SUMMARY

To solve the above-mentioned problems, a drawing device according to the present invention applies drawing liquid containing a drawing material dissolved or dispersed in a solvent onto a substrate and includes a liquid drop emitter having a liquid drop ejection head for ejecting the drawing liquid onto the substrate, a substrate stage having the substrate mounted thereon, moving means for relatively moving the liquid drop ejection head or the substrate stage, control means for controlling at least one of the liquid drop ejection head and the substrate stage, and solvent outflow prevention means for preventing the solvent from flowing out, the solvent outflow prevention means disposed on at least one of the liquid drop ejection head and the substrate stage. The solvent outflow prevention means creates a solvent atmosphere on the surface of the liquid drop ejection head or the substrate stage, thus preventing evaporation of the solvent from the holes of liquid drop nozzles.

If the vapor of the solvent is lighter than air, the solvent outflow prevention means may be a wall extending around the liquid drop ejection head at the droplet ejection side. The solvent outflow prevention means can create a solvent atmosphere inside the wall, thereby preventing the drawing liquid from drying.

A gap between the bottom edge of the wall and the substrate that is greater than or equal to 0.05 mm allows stable and favorable drawing.

A height of the wall ranging from 0.1 to 0.4 mm allows stable and favorable drawing.

If the wall is inclined towards the droplet ejection side, the solvent vapor can stay inside the wall even on the move, thus further preventing the solvent from flowing out.

If a solvent reservoir is disposed on a part of the substrate stage to evaporate the solvent, the solvent can be filled inside the wall, thus creating a solvent atmosphere even before drawing.

If the solvent vapor is heavier than air, the solvent outflow prevention means may be a wall extending around the substrate stage. This creates a solvent atmosphere on the surface of the substrate stage. Accordingly, only the solvent does not evaporate from the liquid drop ejection head moving in the solvent atmosphere and thus nozzle clogging does not occur.

The height of the wall extending around the substrate stage is preferably greater than or equal to 0.5 mm. As a result, the wall can prevent the nozzle from drying while ejecting the droplets reliably.

The drawing device may include a solvent supplying means in order to supply the solvent whose vapor is heavier than air to the surface of the substrate stage, so that a solvent vapor atmosphere is created on the surface of the substrate stage even before drawing.

A solvent whose vapor specific gravity is heavier than that of the solvent dissolving the drawing material may be employed to create the vapor atmosphere inside the solvent outflow prevention means.

An electro-optical unit having improved quality can be manufactured by using the drawing device.

An electronic apparatus including the electro-optical unit having improved quality manufactured by using the drawing device can be obtained.

DETAILED DESCRIPTION

The present invention will now be described in detail with reference to embodiments thereof. The invention, however, is not limited thereto.

Figure 6:
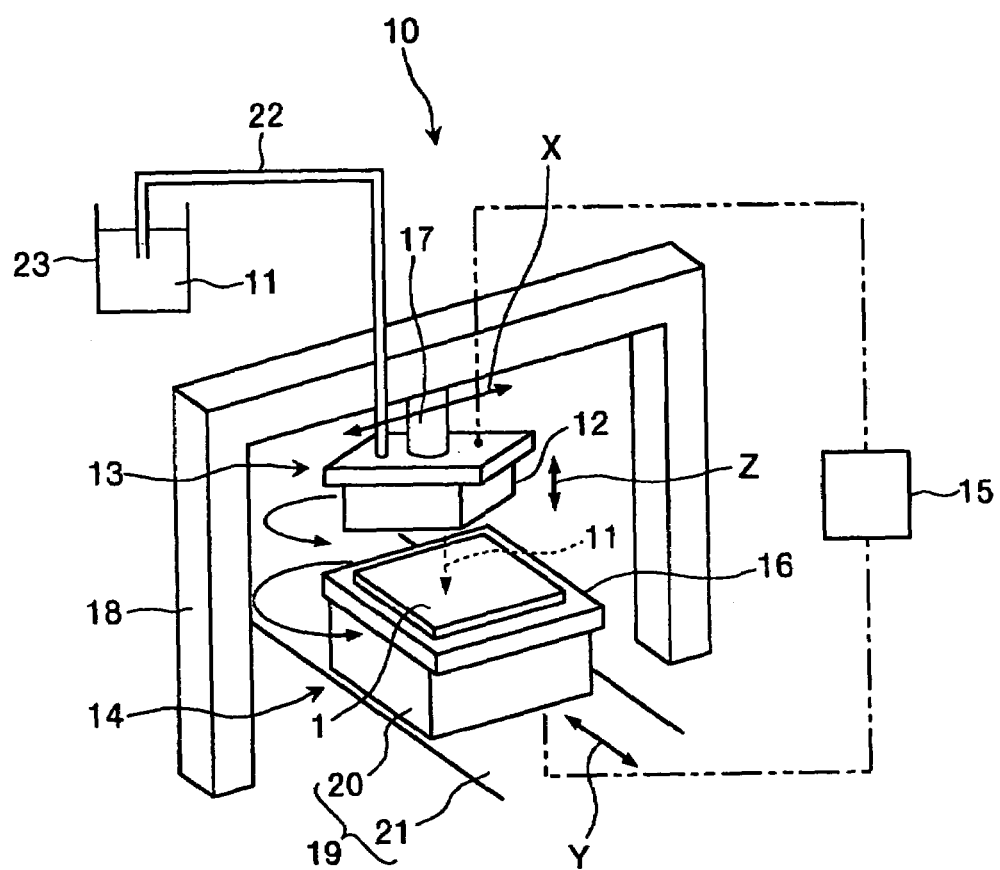
FIG. 6 is a schematic diagram of the structure of the drawing device according to the first embodiment.
Figure 7:
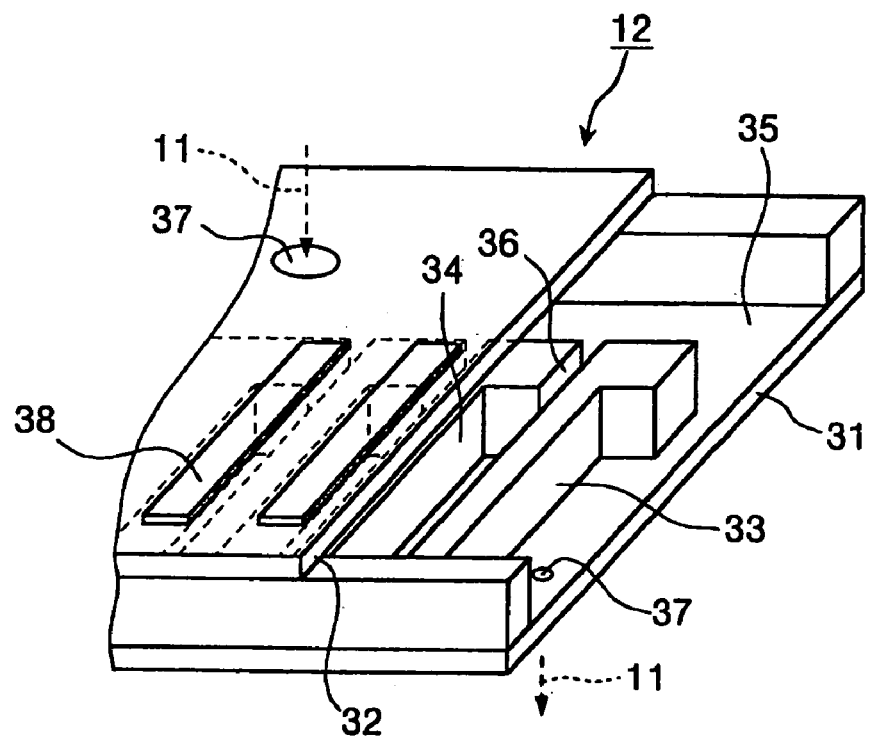
FIG. 7 is a schematic diagram of a liquid drop ejection head according to the first embodiment.
Figure 8:
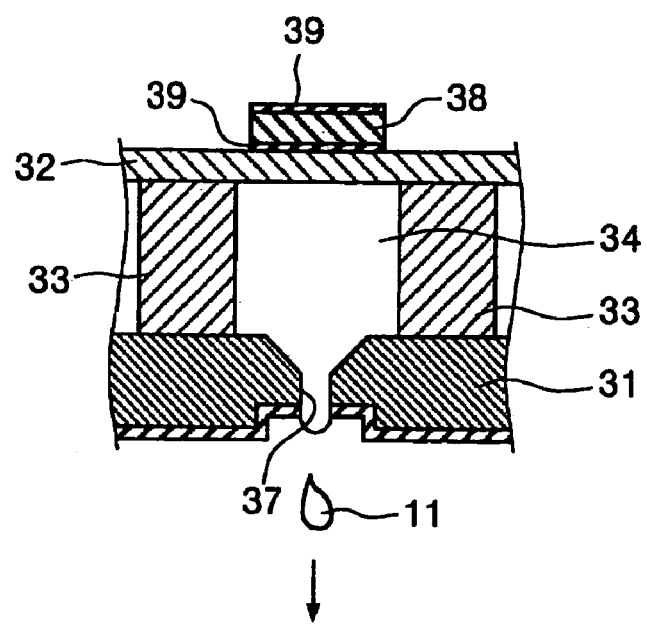
FIG. 8 is a schematic diagram of the liquid drop ejection head according to the first embodiment.
Figure 9:
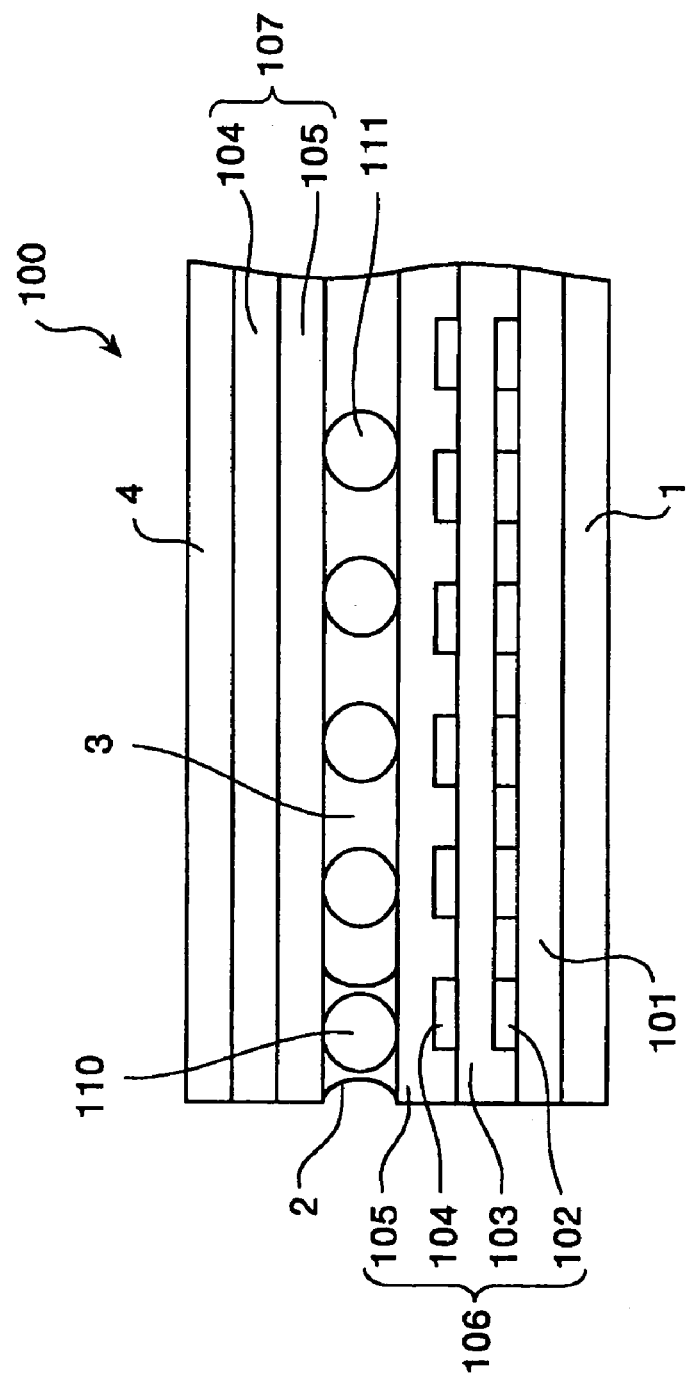
FIG. 9 is a view of the structure of a liquid crystal panel.
Figure 10:
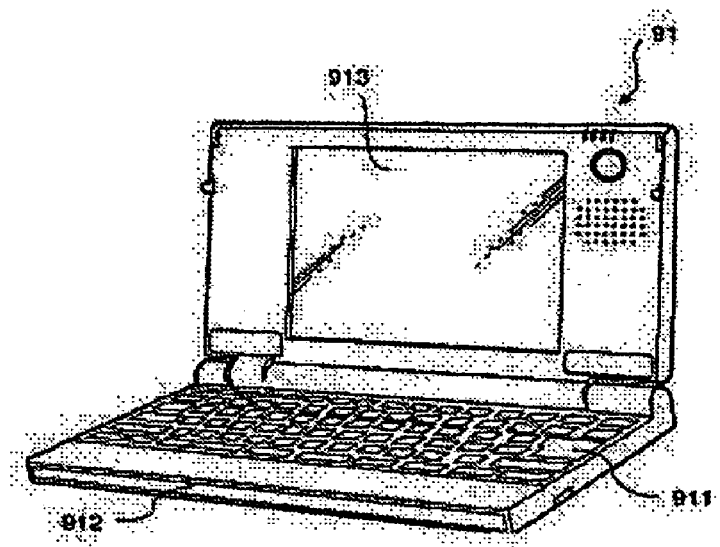
FIG. 10 is a perspective view of a personal computer.
Figure 11:
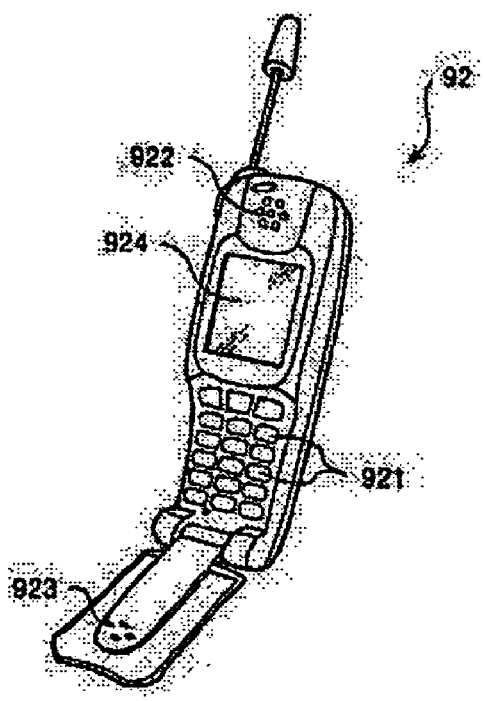
FIG. 11 is a perspective view of a mobile telephone.
Figure 12:
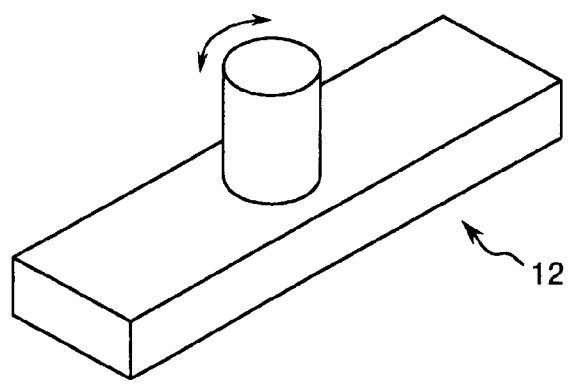
FIGS. 12A–B are schematic views of a droplet ejection nozzle.
Figure 12:
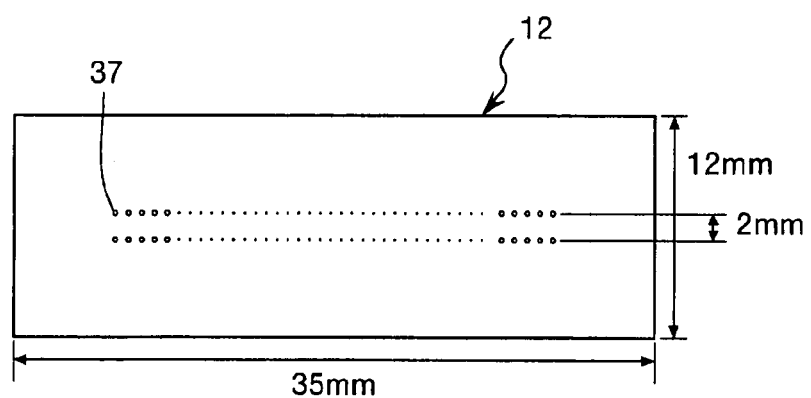
Figure 13:
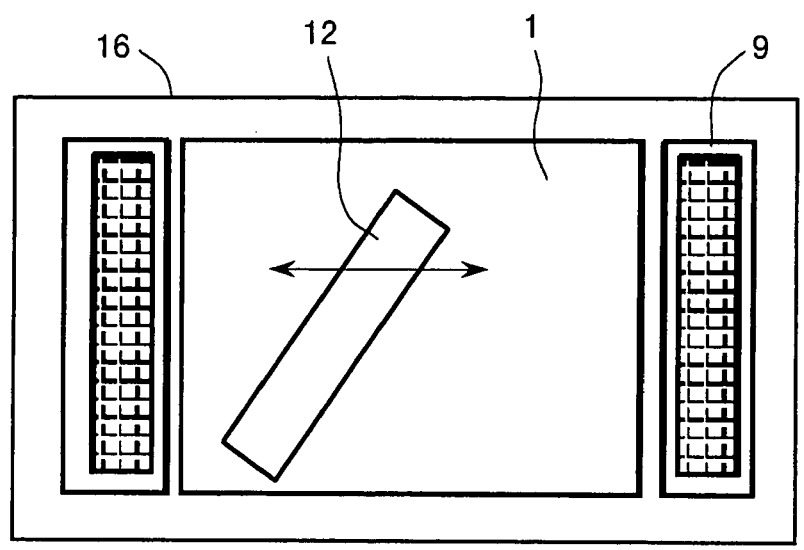
FIG. 13 shows the structure of a liquid crystal inkjet method with a flushing segment.

FIGS. 1 to 5 illustrate the structure of a drawing device according to embodiments of the present invention. FIG. 6 is a schematic diagram of the drawing device. FIGS. 7 and 8 illustrate schematic diagrams of a liquid drop ejection head. FIG. 9 illustrates the structure of a liquid crystal panel. FIG. 10 is a perspective view of a personal computer. FIG. 11 is a perspective view of a mobile telephone.

First Embodiment

The structure of a liquid crystal panel will now be described with reference to FIG. 9. The liquid crystal panel is an electro-optical unit according to the present invention. A liquid crystal panel 100 according to an embodiment of the present invention has a first substrate 1 and a second substrate 4 opposing the first substrate 1. Inner surfaces of the first substrate 1 and the second substrate 4 have liquid crystal display elements 106 and 107 thereon, respectively.

In particular, as shown in FIG. 9, the first substrate 1 has, in order, a reflecting layer 101 including an aluminum film, a color filter (CF) 102, an overcoat layer (OVC) 103, a transparent electrode 104, and an alignment layer 105 disposed thereon. These components define the liquid crystal display element 106 on the first substrate 1.

The opposed second substrate 4 has a transparent electrode 104 and an alignment layer 105 thereon. The transparent electrode 104 may be made of Indium Tin Oxide (ITO) or other transparent electrode materials. The transparent electrode 104 is processed into a predetermined pattern to define the liquid crystal display element 107 on the second substrate 4. The alignment layer 105 made of, for example, polyimide (PI), is processed by alignment control, namely, rubbing.

Between the first substrate 1 and the second substrate 4 having the above-described liquid crystal display elements, a substantially rectangular or frame seal segment 2 is formed. Conductive spacing beads 110 are distributed inside the seal segment 2. Spacing beads 111, which function as spacers, are disposed to ensure a predetermined gap, called the "cell gap", between the first substrate 1 and the second substrate 4. Thus, the seal segment 2 defines a liquid crystal region between the first substrate 1 and the second substrate 4.

A drawing device used for manufacturing the liquid crystal display device according to the embodiment will now be described with reference to FIG. 6.

As shown in FIG. 6, the drawing device 10 according to the embodiment is used for forming a thin film (liquid crystal) on a substrate of the liquid crystal display device. In this embodiment, the drawing device 10 ejects droplets of liquid crystal 3 to the inside region of the frame seal segment 2 on the surface of the first substrate 1 having the liquid crystal display element 106. Subsequently, the second substrate 4 having the opposed liquid crystal display element 107 is bonded to the seal segment 2 to realize the liquid crystal display device shown in FIG. 9.

The seal segment may be made from a commercially available adhesive material. The adhesive material preferably contains dispersed spacing beads to maintain the gap and a predetermined amount of liquid crystal between the two substrates.

Additionally, after the seal segment is formed, the spacing beads may be dispersed on the substrate to maintain a uniform gap between the substrates.

Alternatively, the droplet ejecting device may eject liquid crystal containing spacing beads dispersed therein to eliminate the bead dispersion step.

A thermosetting adhesive or a light-curable adhesive may be used as the seal material. The spacing beads that may be used include plastic beads, such as silica beads or polystyrene beads, or silica beads coated with thermoplastic resin. After being ejected from the droplet ejecting nozzle, a predetermined amount of the liquid crystal is planarly applied to the region surrounded by the frame seal segment on the substrate.

Subsequently, the resulting substrate is bonded to the other substrate and then the adhesive is cured to realize a liquid crystal display device. The substrates are more preferably bonded in a vacuum.

With reference to FIG. 6, the drawing device 10 according to the embodiment includes a liquid drop emitter 13 having a liquid drop ejection head 12 that ejects drawing liquid 11, such as liquid crystal, onto the surface of the first substrate 1 having the liquid crystal display element thereon, moving means 14 for relatively moving the liquid drop ejection head 12 and the substrate 1, and control means 15 for controlling the liquid drop emitter 13 and the moving means 14.

As shown in FIG. 6, the moving means 14 includes a head supporter 17 and a stage driver 19. The head supporter 17 is positioned above the substrate 1 mounted on a substrate stage 16, supports the liquid drop ejection head 12 downwardly, and is moveable in the X axis direction on a stage 18. The stage driver 19 moves the substrate along with the stage 16 in the Y axis direction with respect to the liquid drop ejection head 12.

The head supporter 17 has a mechanism including a linear motor that moves the liquid drop ejection head 12 in the direction perpendicular to the substrate 1, namely, in the Z axis direction, at a predetermined speed to determine the position of the head 12, and a mechanism including a stepping motor that rotates the liquid drop ejection head 12 about the Z axis to freely determine the angle of the head 12 with respect to the lower substrate 1.

The stage driver 19 has a θ-axis stage 20 that rotates the substrate stage 16 about the Z axis to determine a predetermined angle of the stage 16 with respect to the upper liquid drop ejection head 12, and a stage 21 that moves the stage 16 horizontally (in the Y axis direction) to determine the position of the stage 16 with respect to the liquid drop ejection head 12. The θ-axis stage 20 includes a stepping motor, while the stage 21 includes a linear motor.

The liquid drop emitter 13 includes the liquid drop ejection head 12 and a tank 23 connected to the liquid drop ejection head 12 via a tube 22. The tank 23 holds the drawing liquid 11 and supplies it to the liquid drop ejection head 12 through the tube 22. Thus, the liquid drop emitter 13 ejects the drawing liquid 11 held in the tank 23 from the liquid drop ejection head 12 to apply the drawing liquid 11 onto the substrate 1. In the liquid drop ejection head 12, a piezo-electric element compresses a liquid chamber to increase the pressure, which ejects a droplet of the liquid. The liquid drop ejection head 12 has a plurality of nozzles (nozzle holes) aligned along a single line or multiple lines.

An example of the structure of the liquid drop ejection head 12 will now be described with reference to FIGS. 7 and 8. The liquid drop ejection head 12 includes a (e.g., stainless) nozzle plate 31 and a diaphragm 32 which are bonded with a reservoir plate 33 therebetween. The reservoir plate 33 creates a plurality of spaces 34 and a liquid reservoir 35 between the nozzle plate 31 and the diaphragm 32. The spaces 34 and the liquid reservoir 35 are filled with liquid material (not shown). Each space 34 communicates with the liquid reservoir 35 through a supply port 36. The nozzle plate 31 has nozzles 37 having micro-holes to eject the drawing liquid 11 from the spaces 34. On the other hand, the diaphragm 32 has a hole 37 through which the drawing liquid 11 is supplied to the liquid reservoir 35.

As shown in FIGS. 7 and 8, piezo-electric elements 38 are mounted on the surface of the diaphragm 32 not facing to the spaces. As shown in FIG. 8, each of the piezo-electric elements 38 is disposed between two electrodes 39. When electric power is applied to the piezo-electric element, the piezo-electric element flexes to protrude outwardly. The diaphragm 32, which is bonded to the piezo-electric element, also flexes outwardly in synchronization with the movement of the piezo-electric element, thereby increasing the effective volume of the space 34. Accordingly, the same volume of liquid material as the increased volume of the space 34 flows from the liquid reservoir 35 into the space 34 through the supply port 36. When the application of the electric power to the piezo-electric element 38 stops, the piezo-electric element 38 and the diaphragm 32 return to their original shapes and so the space 34 also returns to its original volume. This increases the pressure of the drawing liquid 11 inside the space 34, resulting in ejection of the drawing liquid from the nozzle 37 and spraying thereof onto the substrate 1.

The liquid drop ejection head 12 may be of another type instead of the above-described piezo-jet type using the piezo-electric element. Liquid crystal, which is the drawing liquid 11, may be ejected from the above-described nozzles having micro-holes by vibration or pressure of a tank generated by an ultrasonic motor or a linear motor. In this case, the liquid crystal in the tank is preferably defoamed in advance. Alternatively, the liquid drop emitter 13 may employ a technology known as the Bubblejet (trademark) method, in which liquid crystal in a tank or a mixture of liquid crystal and a low-viscosity flammable liquid is heated to be ejected from micro-holes by expansion and formation of bubbles in the material. The ejection of the liquid crystal can be performed at a desired pressure including vacuum, reduced pressure, normal atmospheric pressure, and increased pressure.

The control means 15 includes a CPU, such as a microprocessor, that controls the entire device, and computers that control the input and output of various signals. With reference again to FIG. 6, the control means 15 is electrically connected to the liquid drop emitter 13 and the moving means 14 so that it controls at least one of the ejecting operation of the liquid drop emitter 13 and the moving operation of the moving means 14, although it controls both in this embodiment.

This design can adjust the ejecting conditions of the liquid to control the thickness of the resultant thin film (liquid crystal).

That is, the control means 15 includes a control function that adjusts the time interval of ejecting the drawing liquid onto the substrate to control the thickness of the liquid, a control function that controls the amount of ejected liquid per dot, control means that determines an angle θ between the alignment direction of the nozzles and the moving direction by the moving means for each ejection, and a control function that determines the ejecting conditions for each region of a substrate which is divided into a plurality of regions.

Further, the control means 15 has the following functions in the above-described time-interval adjusting function: a function that controls the time interval by adjusting the relative speed between the substrate 1 and the liquid drop ejection head 12; a function that controls the time interval by adjusting the ejecting time interval of the moving means; and a function that controls the time interval by arbitrarily selecting active nozzles that eject the drawing liquid at one time among the plurality of nozzles.

With reference to FIGS. 1(a) and 1(b), according to this embodiment, the liquid drop ejection head 12 has a wall 51, which is solvent outflow prevention means for preventing a solvent from flowing out, around its bottom surface. As shown in FIG. 1(b), the rectangular wall 51 allows solvent vapor S, which is one of the materials of the drawing liquid 11, to be filled inside the wall 51. The solvent vapor S inside the wall 51 reduces evaporation of the solvent from the nozzle holes and so prevents an increase in the viscosity of the drawing liquid. As a result, defects, such as clogging by a thin film formed in the nozzle hole, do not occur.

That is, a concentration of the solvent vapor exceeding the equilibrium concentration theoretically stops the evaporation of the solvent. Consequently, the solvent, which is a material of the drawing liquid, does not move from the interior of the nozzle head into the gaseous phase, that is, it does not evaporate, thus preventing an increase in the viscosity of the drawing liquid.

Thus, the fluctuation in the amount of ejected liquid per dot is decreased as compared with the case where flushing is performed. As a result, this design is optimal for fields that require precise droplet ejection.

Additionally, this design reduces wasted drawing liquid by eliminating the flushing essential for known technology. In the case of using quick-drying ink, the flushing is frequently required, and thereby wastes more ink than the drawing itself. This design provides effective use of the ink for drawing. Moreover, this design is particularly suitable for the use of expensive ink or bio-related ink, which can be synthesized only in small amounts, by eliminating the flushing.

As compared with known technology, the drawing time is reduced by eliminating the flushing, thus increasing the productivity.

As compared with known technology, various types of control means are not required by eliminating the flushing, thus simplifying the structure of the device.

In the case where the wall 51 is disposed on the bottom surface of the liquid drop ejection head 12, the solvent vapor is preferably lighter than air.

Alternatively, a solvent whose vapor specific gravity is heavier than that of the solvent dissolving the drawing material may be employed to create an atmosphere where the solvent vapor stays inside the wall 51 as the solvent vapor S.

In this embodiment, a gap between the bottom edge 51a of the wall 51 and the substrate 1 should be greater than or equal to 0.05 mm, and preferably greater than 0.1 mm. A gap smaller than 0.05 mm impairs smooth drawing.

The height of the wall 51 should range from 0.1 to 0.4 mm, and preferably from 0.2 to 0.4 mm. A height smaller than 0.1 mm cannot sufficiently prevent the solvent from flowing out.

Figure 1:
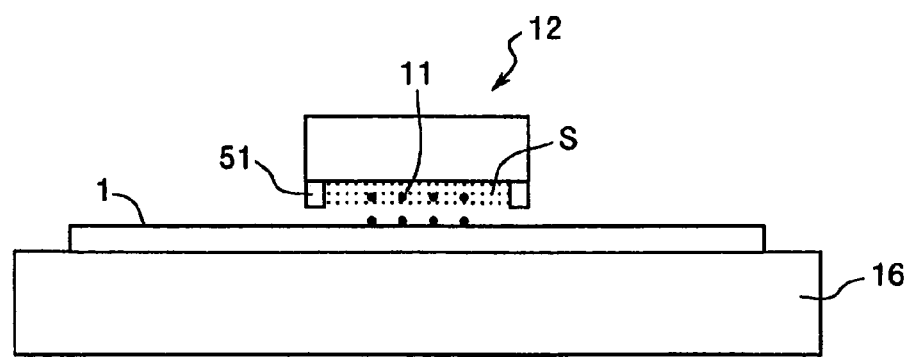
FIGS. 1A–B are schematic diagrams of a portion of a drawing device according to a first embodiment.
Figure 1:
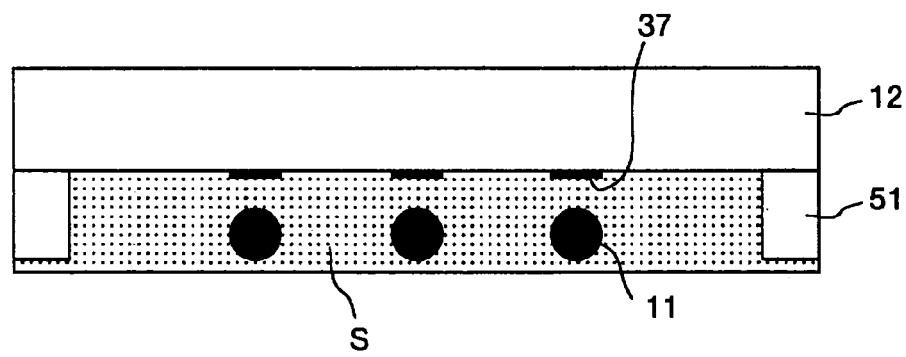
Figure 2:
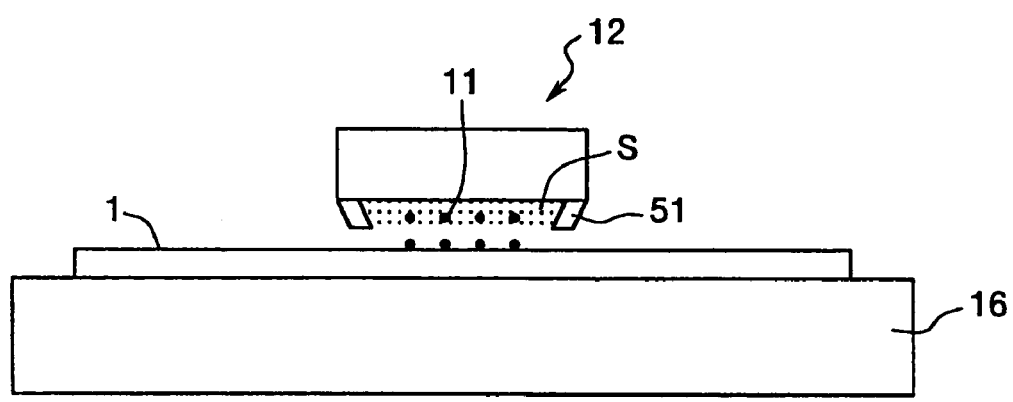
FIG. 2 is a schematic diagram of a portion of another drawing device according to the first embodiment.

With reference to FIG. 2, the wall 51 extending from the periphery may be inclined towards the ink nozzle side. The inclined wall 51 prevents the solvent from flowing out when the liquid drop ejection head or the substrate moves.

Figure 3:
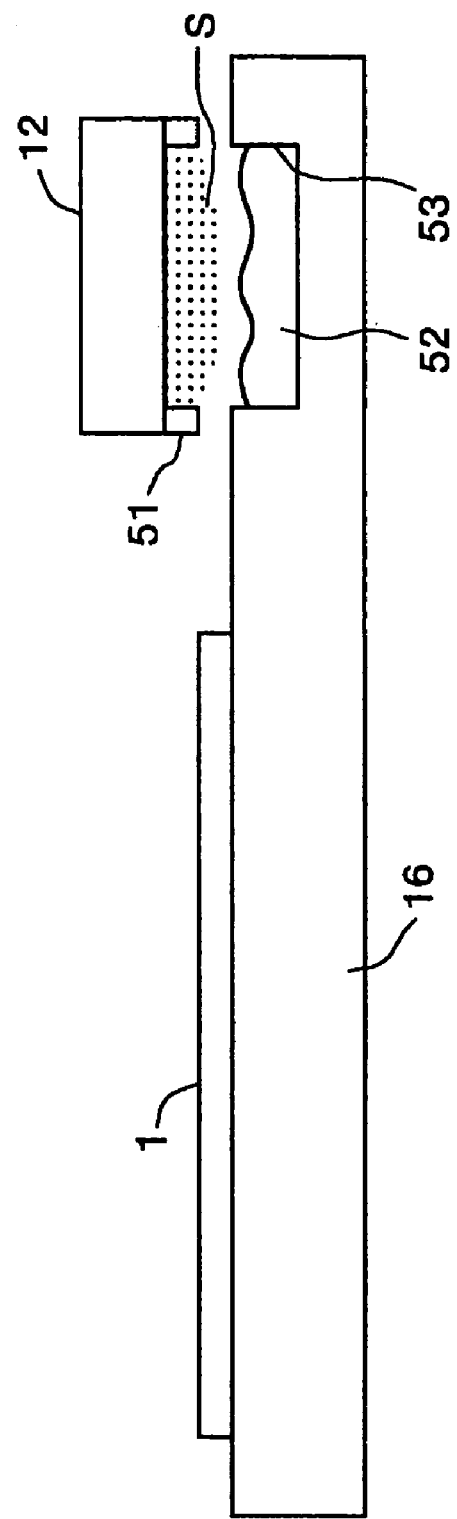
FIG. 3 is a schematic diagram of a portion of another drawing device according to the first embodiment.

With reference to FIG. 3, a solvent reservoir 53 may be disposed on a part of the substrate stage 16 to evaporate a solvent 52. The solvent vapor S from the solvent reservoir 53 may be filled inside the wall 51 and may create a solvent atmosphere before drawing. Thus, the region inside the wall 51 can be filled with the atmosphere of the solvent 52 even before drawing, thereby preventing the drawing liquid from drying.

In particular, for a large substrate, for example, 150 cm by 150 cm, the liquid drop emitter must eject ink over a wide drawing area. If ink trays for receiving the ink are disposed as in the known technology, the amount of wasted ink significantly increases. Also, the wide area over which the stage must move requires time for the stage to move, which is wasteful. The present invention prevents waste and allows stable ejection of the ink, since the vicinity of the nozzle of the liquid drop ejection head 12 is in the solvent atmosphere at all times.

In this embodiment, liquid crystal is used as the drawing liquid 11, which is applied to the substrate. However, the present invention is not limited to liquid crystal. For example, the present invention can be applied to an ink material with organic electroluminescence (EL), which is a luminescent or fluorescent material, or a hole-transporting material.

In this embodiment, as well as the liquid crystal layer, the present invention can also be applied to a color filter, an alignment layer, an overcoat layer, and metal wiring.

Additionally, the drawing device can be applied to a resist, a micro lens array, and a bio-chip for protein or gene testing.

Second Embodiment

A second embodiment of the drawing device according to the present invention will now be described.

Figure 4:
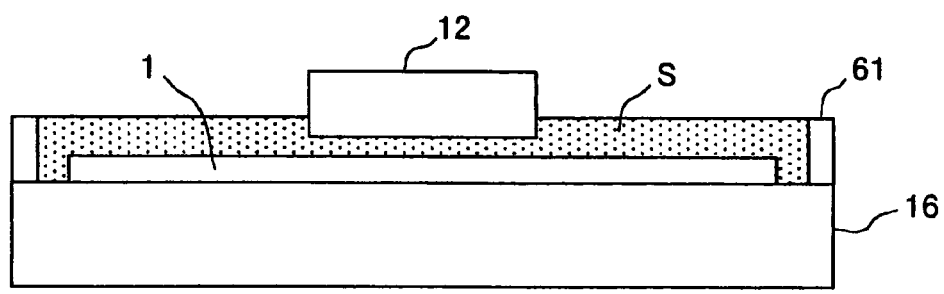
FIG. 4 is a schematic diagram of a portion of a drawing device according to a second embodiment.

With reference to FIG. 4, a drawing device according to the embodiment has a wall 61, which is solvent outflow prevention means for preventing a solvent from flowing out, around a surface of the substrate stage 16. As shown in FIG. 4, the rectangular, frame-shaped wall 61 allows solvent vapor S, which is one of the materials of the drawing liquid, to be filled inside the wall 61. The solvent vapor S inside the wall 61 decreases evaporation of the solvent in the drawing liquid in the vicinity of the nozzle holes disposed on the bottom surface of the liquid drop ejection head 12, which moves in the solvent vapor S, and so prevents an increase in the viscosity of the drawing liquid. As a result, defects, such as clogging by thin films formed on the nozzle holes, do not occur.

In the case where the wall 61 is disposed around the substrate stage 16, the solvent vapor is preferably heavier than air.

For example, the solvent whose vapor is heavier than air includes aromatic solvents, such as acetone with a vapor specific gravity of 2.0 and xylene with a vapor specific gravity of 3.66, and alcohol solvents, such as methanol with a vapor specific gravity of 1.1 and isopropyl alcohol with a vapor specific gravity of 2.99. However, the present invention is not limited thereto. As used herein, the term "vapor specific gravity" refers to the specific gravity of solvent vapor where the specific gravity of air is 1.

Alternatively, a solvent whose vapor specific gravity is heavier than that of the solvent dissolving the drawing material may be employed to generate an atmosphere where the solvent vapor S stays inside the wall 61.

The height of the wall 61 is preferably greater than or equal to 0.5 mm. A height smaller than 0.5 mm cannot efficiently prevent the solvent from flowing out.

In addition, if the bottom surface of the moving liquid drop ejection head 12 is positioned below the height of the wall 61, the nozzle holes move in the solvent vapor. This reduces evaporation of the solvent of the drawing liquid from the nozzle holes and so allows for stable droplet ejection of the drawing liquid.

Figure 5:
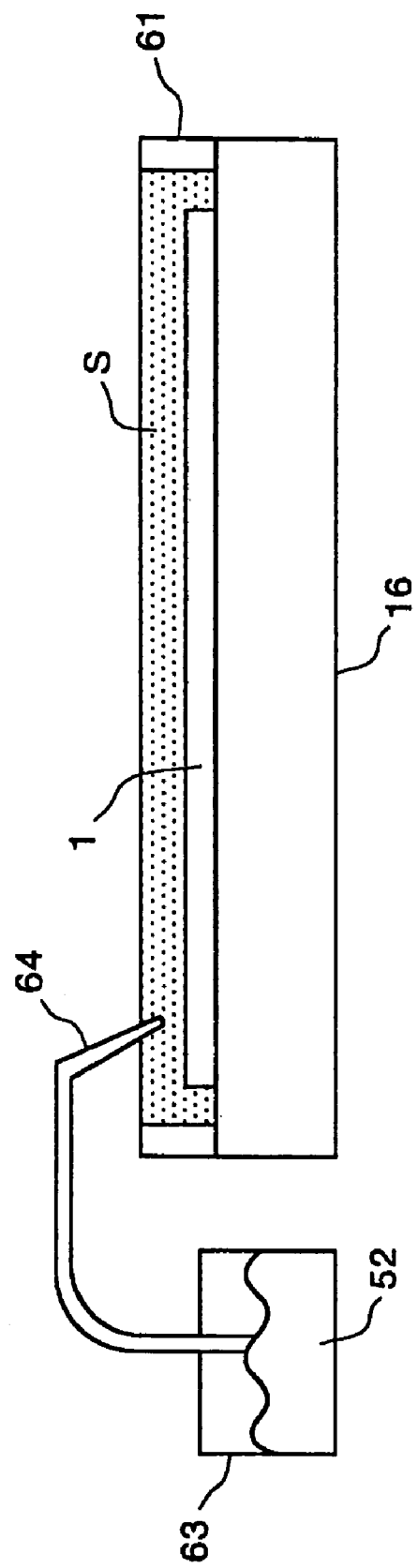
FIG. 5 is a schematic diagram of a portion of the drawing device according to the second embodiment.

With reference to FIG. 5, a solvent vapor supplying means 62 may be provided in order to fill the solvent vapor S inside the region surrounded by the wall 61 on the substrate stage 16.

The solvent vapor supplying means 62 includes a container 63 that contains the solvent 52 and a supply nozzle 64 that supplies the solvent vapor S to the surface of the substrate 1. The solvent vapor supplying means 62 can fill the solvent vapor S inside the wall 61 to create a solvent atmosphere before drawing. Thus, the region inside the wall 61 can be in the solvent atmosphere even before drawing, thereby preventing the drawing liquid from drying.

Third Embodiment

Examples of electronic apparatuses, to which a liquid crystal display panel according to the present invention can be applied, will now be described with reference to FIGS. 10 and 11.

Firstly, an example in which a liquid crystal display panel according to the present invention is applied to a display of a mobile personal computer, known as a notebook PC, will be described. FIG. 10 is a perspective view showing the configuration of a personal computer 91. The personal computer 91 includes a main body 912 having a keyboard 911 and a display unit 913 to which the liquid crystal display panel according to the present invention is applied.

Secondly, an example in which the liquid crystal display panel according to the present invention is applied to a display of a mobile telephone will be described. FIG. 11 is a perspective view showing the configuration of a mobile telephone 92.

The mobile telephone 92 includes a plurality of operation buttons 921, an earpiece 922, a mouthpiece 923, and a display unit 924 to which the liquid crystal display panel according to the present invention is applied.

In addition to the personal computer shown in FIG. 10 and the mobile telephone shown in FIG. 11, the liquid crystal display panel according to the present invention can be applied to other electronic apparatuses including: liquid crystal display TVs, viewfinder type or direct view CRT type video cameras, car navigation systems, pagers, personal digital assistances, portable calculators, word processors, workstations, TV phones, point-of-sale (POS) terminals, and digital still cameras. However, the electric apparatus is not limited thereto.

In the above-described embodiments, the present invention is applied to a liquid crystal device as an electro-optical unit; however, the present invention is not limited thereto. The present invention can be applied to various types of electro-optical units, such as electroluminescent apparatuses, in particular, organic and inorganic electroluminescent apparatuses, plasma displays, field emission displays (FEDs), light-emitting diode (LED) displays, electrophoretic displays, thin CRT displays, small TVs incorporating liquid crystal shutters, and digital micromirror devices (DMDs).

What is claimed is:

1. A drawing device for applying drawing liquid containing a drawing material dissolved or dispersed in a solvent onto a substrate comprising:
   a liquid drop emitter having a liquid drop ejection head selectively ejecting the drawing liquid onto the substrate;
   a substrate stage having the substrate mounted thereon;
   moving means for relatively moving the liquid drop ejection head or the substrate stage;
   control means for controlling at least one of the liquid drop ejection head and the substrate stage;
   solvent outflow prevention means for preventing the solvent from flowing out, the solvent outflow prevention means disposed on at least one of the liquid drop ejection head and the substrate stage; and
   a solvent reservoir disposed on a part of the stage to evaporate a solvent.

2. A drawing device for applying drawing liquid containing a drawing material dissolved or dispersed in a solvent onto a substrate comprising:
   a liquid drop emitter having a liquid drop ejection head selectively ejecting the drawing liquid onto the substrate;
   a substrate stage having the substrate mounted thereon;
   moving means for relatively moving the liquid drop ejection head or the substrate stage;
   control means for controlling at least one of the liquid drop ejection head and the substrate stage; and
   solvent outflow prevention means for preventing the solvent from flowing out, the solvent outflow prevention means disposed on at least one of the liquid drop ejection head and the substrate stage,
   wherein a vapor of the solvent is heavier than air and the solvent outflow prevention means is a wall extending around the substrate stage.

3. The drawing device according to claim 2, wherein a height of the wall extending around the substrate stage is greater than or equal to 0.5 mm.

4. The drawing device according to claim 2, further comprising a solvent supplying means for supplying the solvent to the surface of the substrate stage.

* * * * *